United States Patent
Kim et al.

(10) Patent No.: US 10,306,667 B2
(45) Date of Patent: May 28, 2019

(54) METHOD FOR TRANSMITTING AND RECEIVING UPLINK ACKNOWLEDGEMENT SIGNAL IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/772,799

(22) PCT Filed: Jan. 16, 2017

(86) PCT No.: PCT/KR2017/000527
§ 371 (c)(1),
(2) Date: May 1, 2018

(87) PCT Pub. No.: WO2017/142210
PCT Pub. Date: Aug. 24, 2017

(65) Prior Publication Data
US 2018/0324840 A1    Nov. 8, 2018

Related U.S. Application Data

(60) Provisional application No. 62/296,082, filed on Feb. 17, 2016, provisional application No. 62/329,172, filed on Apr. 28, 2016.

(51) Int. Cl.
*H04W 72/12*    (2009.01)
*H04L 1/00*    (2006.01)
(Continued)

(52) U.S. Cl.
CPC .......... *H04W 72/1289* (2013.01); *H04L 1/00* (2013.01); *H04L 1/16* (2013.01); *H04L 27/26* (2013.01); *H04W 84/12* (2013.01); *H04B 7/0452* (2013.01)

(58) Field of Classification Search
CPC .... H04W 72/1289; H04W 84/12; H04L 1/16; H04L 1/00; H04L 27/26; H04B 7/0452
See application file for complete search history.

(56) References Cited

U.S. PATENT DOCUMENTS

| | | | |
|---|---|---|---|
| 2016/0043855 A1* | 2/2016 | Seok | H04L 5/0055 370/330 |
| 2017/0255659 A1* | 9/2017 | Cariou | G06F 17/30324 |
| 2018/0288800 A1* | 10/2018 | Yu | H04W 76/15 |

FOREIGN PATENT DOCUMENTS

| | | | | |
|---|---|---|---|---|
| KR | 20070020033 A | * | 2/2007 | ............ H04W 28/06 |
| KR | 20090087480 A | * | 8/2009 | ......... H04L 12/2832 |

(Continued)

OTHER PUBLICATIONS

PCT International Application No. PCT/KR2017/000527, International Search Report dated Apr. 25, 2017, 11 pages.

(Continued)

*Primary Examiner* — Afshawn M Towfighi
(74) *Attorney, Agent, or Firm* — Lee, Hong, Degerman, Kang & Waimey (57) ABSTRACT

Disclosed is a method for transmitting an acknowledgement signal in response to downlink data by a station (STA) in a wireless local area network (WLAN) system. To this end, the STA receives a downlink physical protocol data unit (PPDU) including a control information subfield for uplink scheduling information and downlink data from an access point (AP) and transmits, to the AP, an uplink PPDU including an acknowledgement signal in response to the downlink data according to the uplink scheduling information. In this case, the control information subfield may include length information of the uplink PPDU, resource unit (RU) allocation information for the uplink PPDU, modulation and coding scheme (MCS) information for the uplink PPDU, transmit power of the AP, and target receive signal strength indicator (RSSI) information of the AP.

12 Claims, 5 Drawing Sheets

(51) Int. Cl.
*H04L 27/26* (2006.01)
*H04W 84/12* (2009.01)
*H04L 1/16* (2006.01)
*H04B 7/0452* (2017.01)

(56) References Cited

FOREIGN PATENT DOCUMENTS

| KR | 20140103359 A | * | 8/2014 | ........... H04L 1/1607 |
| KR | 20160013820 A | * | 2/2016 | ........... H04L 5/0055 |
| WO | 2015068968 | | 5/2015 | |
| WO | 2016021831 | | 2/2016 | |

OTHER PUBLICATIONS

Stacey, R., "Specification Framework for TGax", IEEE P802.11 Wireless LANs, doc.: IEEE 80211-15/0132r15, Jan. 2016, 43 pages.
Porat, R. et al., "SIG-A Fields and Bitwidths", doc.: IEEE 802.11-15/1354r1, Nov. 2015, 17 pages.

* cited by examiner

| Frame Control | Duration | (RA) | TA | Common Info | Per User Info | ... | Per User Info | Padding | FCS |
|---|---|---|---|---|---|---|---|---|---|
| Octets: 2 | 2 | 6 | 6 | TBD | TBD | | TBD | | 4 |

FIG. 4

| Length | Cascade Indication | HE-SIG-A Info | CP and LTF Type | Trigger Type | Trigger-dependent Common Info |
|---|---|---|---|---|---|
| Bits: 12 | 1 | TBD | TBD | TBD | variable |

FIG. 5

| User Indentifier | RU Allocation | Coding Type | MCS | DCM | SS Allocation | Trigger dependent Per User Info |
|---|---|---|---|---|---|---|
| Bits: 12 | TBD | TBD | TBD | TBD | TBD | variable |

| B0 B4 | B5 B12 | B13 B17 | B18 B22 | B23 B24 | B25 |
|---|---|---|---|---|---|
| UL PPDU Length | RU Allocation | DL Tx Power | UL Target RSSI | UL MCS | Reserved |

Bits: 5      8      5      5      2      1

FIG. 11

METHOD FOR TRANSMITTING AND RECEIVING UPLINK ACKNOWLEDGEMENT SIGNAL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/000527, filed on Jan. 16, 2017, which claims the benefit of U.S. Provisional Application Nos. 62/296,082, filed on Feb. 17, 2016, and 62/239,172, filed on Apr. 28, 2016, the contents of which are all hereby incorporated by reference herein in their entirety.

TECHNICAL FIELD

The present invention relates to transmission and reception of uplink acknowledgement signals in a wireless local area network (WLAN) system, and more particularly, to a method for efficiently transmitting and receiving acknowledgement signals in response to downlink multi-user data and apparatus therefor.

BACKGROUND ART

While the proposed method for transmitting and receiving the acknowledgement signals can be applied to various wireless communication systems, the WLAN system is described as an example of the system to which the present invention can be applied.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

Generally, in the WLAN system, each station (STA) determines whether a medium is in an idle or busy state by sensing the medium and then performs data transmission in a contention-based manner. However, considering that the IEEE 801.11ax standards adopt a multi-user transmission scheme where a plurality of STAs transmit data to an access point (AP) in uplink and the AP transmits data to the plurality of STAs in downlink, a communication method capable of reflecting uplink and downlink scheduling needs to be developed.

According to the uplink multi-user transmission scheme, scheduling information for transmission of a physical protocol data unit (PPDU) for uplink multi-user transmission can be transmitted using a trigger frame. However, if the AP transmits a PPDU for downlink multi-user transmission and a separate trigger frame to receive an acknowledgement signal in response to the PPDU in a multi-user manner as well, it may cause a delay in the process or unnecessary signaling overhead.

That is, the object of the present invention is to provide a method for efficiently transmitting and receiving acknowledgement signals in response to downlink multi-user data and apparatus therefor.

It will be appreciated by persons skilled in the art that the objects that could be achieved with the present invention are not limited to what has been particularly described hereinabove and other objects that the present invention could achieve will be more clearly understood from the following detailed description.

Technical Solutions

In a first aspect of the present invention, provided herein is a method for transmitting an acknowledgement signal in response to downlink data by a station (STA) in a wireless local area network (WLAN) system, including: receiving a downlink physical protocol data unit (PPDU) including a control information subfield for uplink scheduling information and downlink data from an access point (AP); and transmitting, to the AP, an uplink PPDU including an acknowledgement signal in response to the downlink data according to the uplink scheduling information. In this case, the control information subfield may include length information of the uplink PPDU, resource unit (RU) allocation information for the uplink PPDU, modulation and coding scheme (MCS) information for the uplink PPDU, transmit power of the AP, and target receive signal strength indicator (RSSI) information of the AP.

Preferably, the control information subfield may not include spatial reuse information, and when receiving the downlink PPDU, the STA may be configured to disable spatial reuse.

Preferably, when receiving the downlink PPDU, the STA may be configured to change a cyclic prefix (CP) and long training field (LTF) structure into one of two structures: (1) a structure in which a 4×LTF and a 3.2 us CP are used; and (2) a structure in which a 2×LTF and a 1.6 us CP are used.

Preferably, the control information subfield may not include dual carrier modulation (DCM) information, and the STA may be configured to determine whether to apply DCM to the uplink PPDU in consideration of an MCS of the downlink PPDU.

Preferably, the control information subfield may not include bandwidth information, and the STA may be configured to set a bandwidth of the uplink PPDU to be identical to that of the downlink PPDU.

Preferably, the control information subfield may not include information on a multi-user (MU) multi-input multi-output (MIMO) long training field (LTF) mode, a space time block code (STBC), the number of streams, a stream allocation, and a coding type, and when receiving the downlink PPDU, the STA may be configured to set parameters for the MU MIMO LTF mode, the STBC, the number of streams, the stream allocation, and the coding type to 0.

Preferably, the MCS information may have a length of 2 bits, and the STA may be configured to select an MCS level corresponding to the MCS information from four lowest MCS levels among a plurality of predetermined MCS levels.

Preferably, the uplink PPDU may include one of an individual acknowledgement signal, a block acknowledgement (BA) signal, and a multi-STA BA signal in response to the downlink data.

Preferably, the control information subfield may have a length of 30 bits by additionally including 4 bits of control ID information, and the length information of the uplink PPDU may have a length of 5 bits.

In a second aspect of the present invention, provided herein is a station (STA) for transmitting an acknowledgement signal in response to downlink data in a wireless local area network (WLAN) system, including: a transceiver configured to receive a downlink physical protocol data unit (PPDU) including a control information subfield for uplink scheduling information and downlink data from an access point (AP); and a processor configured to process the uplink scheduling information and control the transceiver to transmit an uplink PPDU including an acknowledgement signal in response to the downlink data to the AP. In this case, the processor may be configured to process the uplink scheduling information by assuming that the control information subfield includes length information of the uplink PPDU, resource unit (RU) allocation information for the uplink PPDU, modulation and coding scheme (MCS) information for the uplink PPDU, transmit power of the AP, and target receive signal strength indicator (RSSI) information of the AP.

Preferably, when the downlink PPDU is received, the processor may be configured to disable spatial reuse of the uplink PPDU by assuming that the control information subfield does not include spatial reuse information.

Preferably, when the downlink PPDU is received, the processor may be configured to change a cyclic prefix (CP) and long training field (LTF) structure into one of two structures: (1) a structure in which a 4×LTF and a 3.2 us CP are used; and (2) a structure in which a 2×LTF and a 1.6 us CP are used.

Preferably, the processor may be configured to determine whether to apply dual carrier modulation (DCM) to the uplink PPDU in consideration of an MCS of the downlink PPDU by assuming that the control information subfield does not include DCM information.

In a third aspect of the present invention, provided herein is a method for receiving an acknowledgement signal in response to downlink data from a station (STA) by an access point (AP) in a wireless local area network (WLAN) system, including: transmitting a downlink physical protocol data unit (PPDU) including a control information subfield for uplink scheduling information and downlink data to the STA; and receiving, from the STA, an uplink PPDU including an acknowledgement signal in response to the downlink data according to the uplink scheduling information. In this case, the control information subfield may include length information of the uplink PPDU, resource unit (RU) allocation information for the uplink PPDU, modulation and coding scheme (MCS) information for the uplink PPDU, transmit power of the AP, and target receive signal strength indicator (RSSI) information of the AP.

In a fourth aspect of the present invention, provided herein is an access point (AP) for receiving an acknowledgement signal in response to downlink data from a station (STA) in a wireless local area network (WLAN) system, including: a processor configured to configure a downlink physical protocol data unit (PPDU) including a control information subfield for uplink scheduling information and downlink data; and a transceiver configured to transmit the downlink PPDU to the STA by receiving the downlink PPDU from the processor and receive, from the STA, an uplink PPDU including an acknowledgement signal in response to the downlink data according to the uplink scheduling information. In this case, the processor may be configured to configure the control information subfield to include length information of the uplink PPDU, resource unit (RU) allocation information for the uplink PPDU, modulation and coding scheme (MCS) information for the uplink PPDU, transmit power of the AP, and target receive signal strength indicator (RSSI) information of the AP.

Advantageous Effects

According to embodiments of the present invention, efficient communication can be achieved by transmitting an acknowledgement signal in response to downlink multi-user data without a separate trigger frame.

It will be appreciated by persons skilled in the art that the effects that can be achieved through the present invention are not limited to what has been particularly described hereinabove and other advantages of the present invention will be more clearly understood from the following detailed description.

BEST MODE FOR INVENTION

Hereinafter, preferred embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out. In addition, the detailed description includes specific details for the purpose of providing a thorough understanding of the present invention. However, it will be apparent to those skilled in the art that the present invention may be practiced without the specific details.

Figure 1:
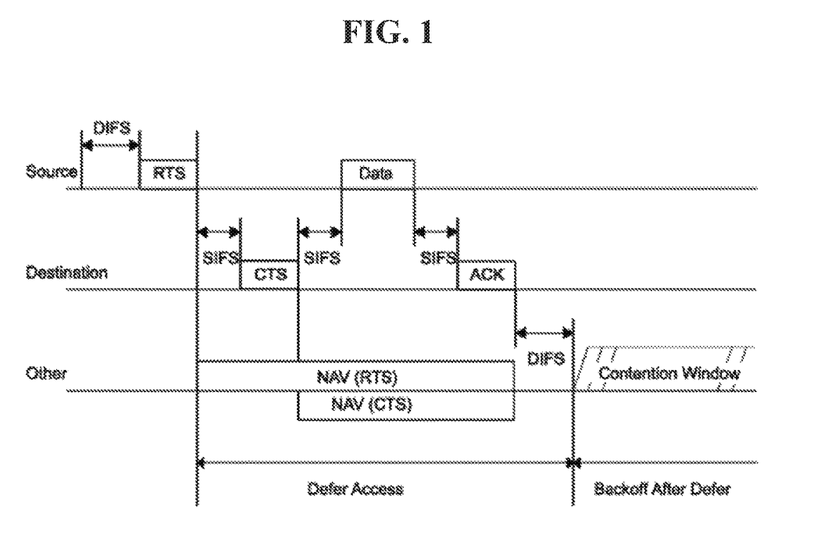
FIG. 1 is a diagram for explaining a general data transmission method for STAs in a WLAN system.

FIG. 1 is a diagram for explaining a general data transmission method for STAs in a WLAN system.

As described above, the WLAN system uses contention-based data transmission. According to the contention-based data transmission, a first STA (source STA) recognizes whether a medium is in an idle or busy state by sensing the medium and then obtains a transmission opportunity (TXOP) for transmitting data to a second STA (destination STA).

Referring to FIG. 1, before transmitting data to the second STA, the first STA transmits a request to send (RTS) frame to the second STA and then receives a clear to send (CTS) frame in response to the RTS frame from the second STA. Such an RTS/CTS frame exchange is to solve the well-known hidden/exposed node problem and, a third STA (other STAs) can configure a network allocation vector (NAV) by considering data transmission intervals used for the RTS/CTS frame exchange. In addition, as shown in FIG. 1, the third STA delays its access to the medium during a NAV configuration period. After expiration of the NAV configuration period, the third STA can prepare transmission by performing a backoff procedure during a contention window.

Meanwhile, after receiving the CTS frame from the second STA, the first STA may transmit data after a short interframe space (SIFS). In addition, the second STA may transmit an acknowledgement (ACK) frame after receiving the data transmitted from the first STA.

However, since an IEEE 802.11 ax system (hereinafter referred to as a high efficiency (HE) system) uses a multi-user transmission scheme where a plurality of STAs transmit data to an access point (AP) in uplink and the AP transmits data to the plurality of STAs in downlink, which is different from the general contention-based data transmission, a communication method capable of reflecting uplink and downlink scheduling needs to be developed.

Figure 2:
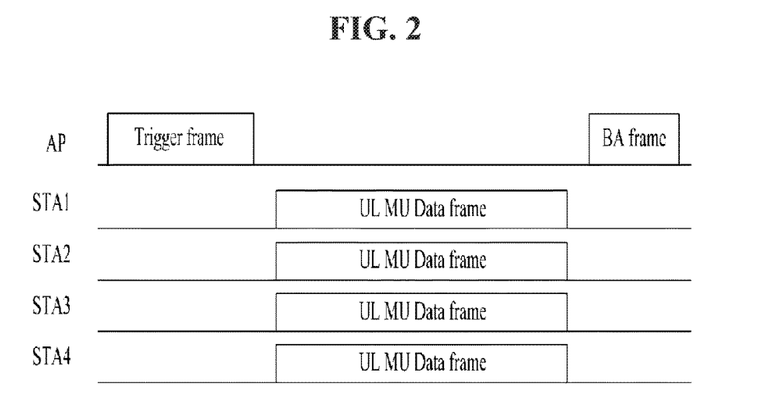
FIG. 2 is a diagram for explaining an example of uplink multi-user transmission in an HE system.

FIG. 2 is a diagram for explaining an example of uplink multi-user transmission in an HE system.

An uplink (UL) multi-user (MU) transmission scheme can be used in the HE system as described above, and an AP can transmit trigger frames to a plurality of STAs (e.g., STA 1 to STA 4) to initiate the UL MU transmission. Here, the trigger frame may include UL MU allocation information (e.g., resource location and size, STA IDs, MCS, MU type (e.g., MIMO, OFDMA, etc.)). Details of information to be included in the trigger frame will be described later together with a trigger frame structure.

Each of the plurality of STAs (i.e., STA 1 to 4) that receive the trigger frames from the AP can transmit a UL MU data frame based on scheduling information of the trigger frame, and the AP can transmit an ACK signal in response to the UL MU data frame. Moreover, the ACK signal may be transmitted in a block ACK frame or multi-user block ACK frame for efficient transmission.

Uplink Scheduling Information

Figure 3:
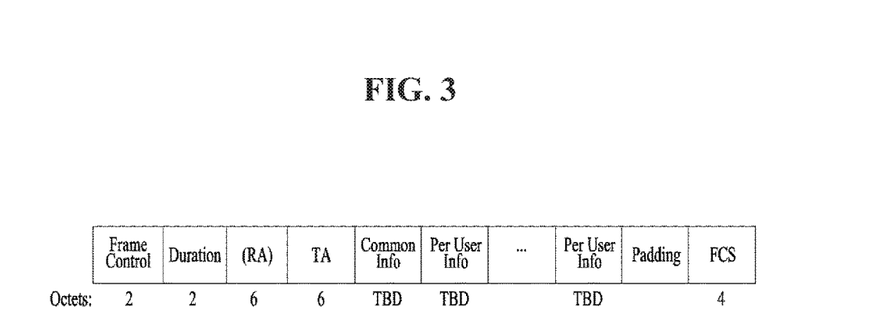
FIGS. 3 to 5 are diagrams for explaining trigger frame formats used in an HE system.
Figure 4:
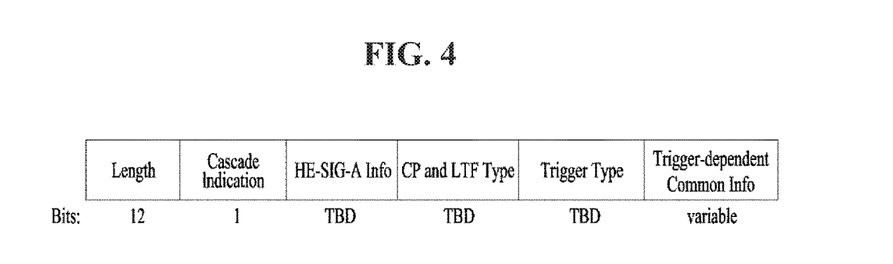
Figure 5:
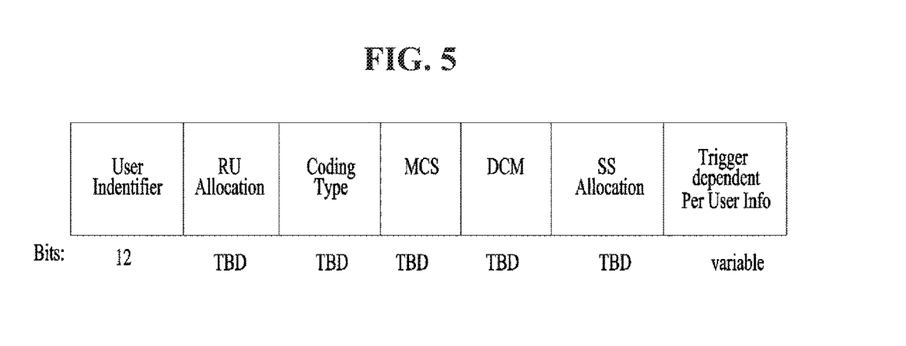

FIGS. 3 to 5 are diagrams for explaining trigger frame formats used in an HE system.

Specifically, FIG. 4 illustrates a Common Info field (common information field) of the trigger frame shown in FIG. 3 and FIG. 5 illustrates a Per User Info field (user-specific information field) of the trigger frame shown in FIG. 3.

Referring back to FIG. 3, a Duration field indicates a length of the corresponding frame, an RA field indicates an STA that will receive the trigger frame, and a TA field indicates an STA that has transmitted the trigger frame.

A Length subfield of the common information field shown in FIG. 4 may indicate a value of an L-SIG length field of an HE trigger-based PPDU, which is transmitted in response to the trigger frame. If a Cascade Indication field is set to '1', it may indicate that another trigger frame will be transmitted after reception of the corresponding trigger frame. Otherwise, the Cascade Indication field is set to '0'.

In addition, an HE-SGI-A Info subfield of the Common Info field may indicate contents of an HE-SIG-A field in an HE trigger-based PPDU response, which is transmitted in response to the trigger frame.

A CP and LTF Type subfield of FIG. 4 may indicate a CP and HE-LTF type of the HE trigger-based PPDU response. Table 1 shows available CP and LTF types.

TABLE 1

| CP and LTF field value | Description |
| --- | --- |
| 0 | 2x LTF + 0.8 µs CP |
| 1 | 2x LTF + 1.6 µs CP |
| 2 | 4x LTF + 3.2 µs CP |
| 3-TBD | Reserved |

A Trigger Type subfield of FIG. 4 may indicate a type of the trigger frame. Table 2 shows available trigger frame types.

TABLE 2

| Trigger Type value | Trigger Type description |
| --- | --- |
| 0 | Basic Trigger |
| 1 | Beamforming Report Poll Trigger |
| 2 | MU-BAR |
| 3 | MU-RTS |
| 4-TBD | Reserved |

Hereinafter, details of the Per User Info field will be described with reference to FIG. 5.

First, a User Identifier subfield indicates an AID of an STA allocated to a resource unit (RU) for transmitting MPDU(s) included in the HE trigger-based PPDU.

In addition, an RU Allocation subfield of the Per User Infor field indicates an RU used by the STA, which is indicated by the User Identifier subfield, to transmit the HE trigger-based PPDU.

Moreover, a Coding Type subfield of the Per User Info field indicates a coding type of the HE trigger-based PPDU. For example, if the corresponding field is set to '0', it may indicate BCC. On the other hand, if the field is set to '1', it may indicate LDPC.

Furthermore, an MCS subfield may indicate an MCS applicable to the HE trigger-based PPDU response. Table 3 shows examples of an MCS applicable in case of one stream and a 26-tones RU.

TABLE 3

| | | | | | | | | Data rate (Mbps) | | |
| --- | --- | --- | --- | --- | --- | --- | --- | --- | --- | --- |
| HE-MCS Index | DCM | Modulation | R | $N_{BPCS}$ | $N_{SD}$ | $N_{CBPS}$ | $N_{DBPS}$ | 0.8 µs GI | 1.6 µs GI | 3.2 µs GI |
| 0 | 1 | BPSK | 1/2 | 1 | 12 | 12 | 6 | 0.4 | 0.4 | 0.4 |
| | 0 | | 1/2 | | 24 | 24 | 12 | 0.9 | 0.8 | 0.8 |
| 1 | 1 | QPSK | 1/2 | 2 | 12 | 24 | 12 | 0.9 | 0.8 | 0.8 |
| | 0 | | 1/2 | | 24 | 48 | 24 | 1.8 | 1.7 | 1.5 |

TABLE 3-continued

| HE-MCS Index | DCM | Modulation | R | $N_{BPCS}$ | $N_{SD}$ | $N_{CBPS}$ | $N_{DBPS}$ | Data rate (Mbps) 0.8 µs GI | 1.6 µs GI | 3.2 µs GI |
|---|---|---|---|---|---|---|---|---|---|---|
| 2 | N/A | | 3/4 | | 24 | 48 | 36 | 2.6 | 2.5 | 2.3 |
| 3 | 1 | 16-QAM | 1/2 | 4 | 12 | 48 | 24 | 1.8 | 1.7 | 1.5 |
| | 0 | | 1/2 | | 24 | 96 | 48 | 3.5 | 3.3 | 3.0 |
| 4 | 1 | | 3/4 | | 12 | 48 | 36 | 2.6 | 2.5 | 2.3 |
| | 0 | | 3/4 | | 24 | 96 | 72 | 5.3 | 5.0 | 4.5 |
| 5 | N/A | 64-QAM | 2/3 | 6 | 24 | 144 | 96 | 7.1 | 6.7 | 6.0 |
| 6 | | | 3/4 | | | | 108 | 7.9 | 7.5 | 6.8 |
| 7 | | | 5/6 | | | | 120 | 8.8 | 8.3 | 7.5 |
| 8 | | 256-QAM | 3/4 | 8 | | 192 | 144 | 10.6 | 10.0 | 9.0 |
| 9 | | | 5/6 | | | | 160 | 11.8 | 11.1 | 10.0 |

A DCM (dual carrier modulation) subfield of FIG. 5 may indicate whether DCM is applied to the HE trigger-based PPDU response. If the corresponding subfield is set to '1', it may indicate that the DCM is applied to the HE trigger-based PPDU. Otherwise, the corresponding subfield is set to '0'.

An SS Allocation subfield may indicate the number of spatial streams of the HE trigger-based PPDU response Further, a Padding field is to provide a time necessary for each HE STA to prepare UL MU transmission.

According to the UL MU transmission scheme, scheduling information for transmission of a PPDU for UL MU transmission can be transmitted using a trigger frame. However, if the AP transmits a PPDU for DL MU transmission and a separate trigger frame to receive an ACK signal in response to the PPDU in a multi-user manner as well, it may cause a delay in the process or unnecessary signaling overhead.

Scheme of Transmitting Scheduling Information for UL ACK Signal

Figure 6:
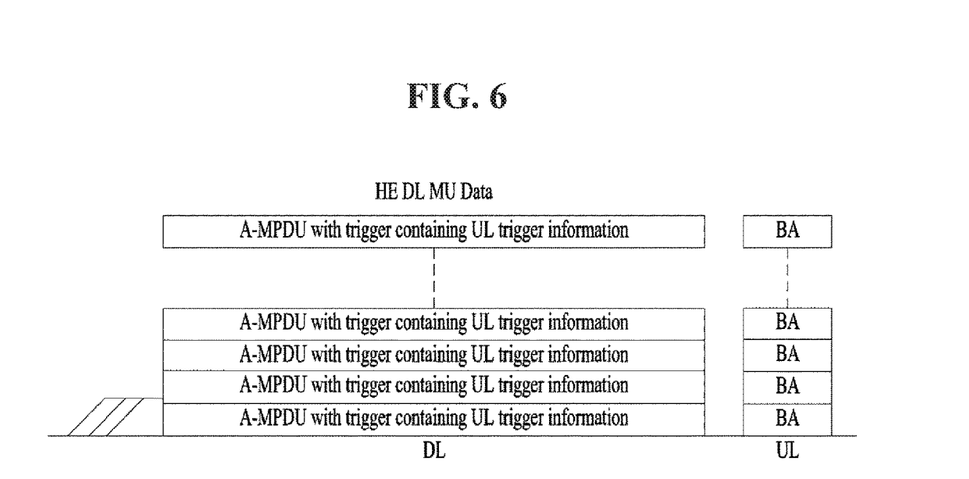
FIG. 6 is a diagram for explaining a method for transmitting an uplink acknowledgement signal according to an embodiment of the present invention.

FIG. 6 is a diagram for explaining a method for transmitting an UL ACK signal according to an embodiment of the present invention.

According to a DL MU transmission scheme, an ACK signal in response to DL data can be transmitted in a multi-user manner. However, to transmit such an ACK signal in a multi-user manner, scheduling information therefor is necessary.

According to the general UL MU transmission scheme, scheduling information for transmission of a PPDU for UL MU transmission can be transmitted using a trigger frame as described above. However, if the AP transmits a PPDU for DL MU transmission and a separate trigger frame to receive an ACK signal in response to the PPDU in a multi-user manner as well, it may cause a delay in the process or unnecessary signaling overhead.

To solve this problem, it is proposed in an embodiment of the present invention to transmit UL trigger information by including it in a DL PPDU when data is transmitted in a DL MU manner as shown in FIG. 6. Specifically, FIG. 6 illustrates a case in which the UL trigger information is transmitted by being included in an A-MPDU transmitted to each user and each STA transmits BA by receiving the UL trigger information included in the DL PPDU. In this case, it is possible to use various ACK signal transmission methods such as general ACK, BA, MU BA, etc.

As described above, the UL MU scheduling information can be included in the DL PPDU in various ways. However, embodiments of the present invention are described based on the method of using an A-control subfield, which is currently used in the WLAN system.

Figure 7:
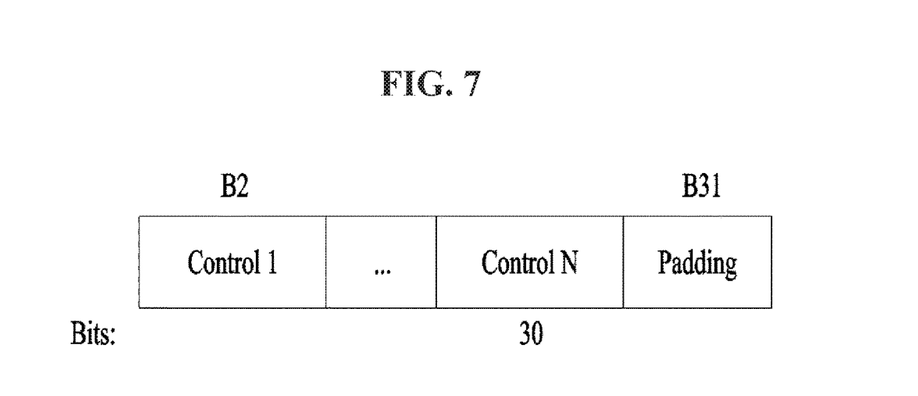
FIGS. 7 and 8 are diagrams illustrating formats of an A-Control subfield for use in transmission of uplink scheduling information, which is included in a DL PPDU according to an embodiment of the present invention.
Figure 8:
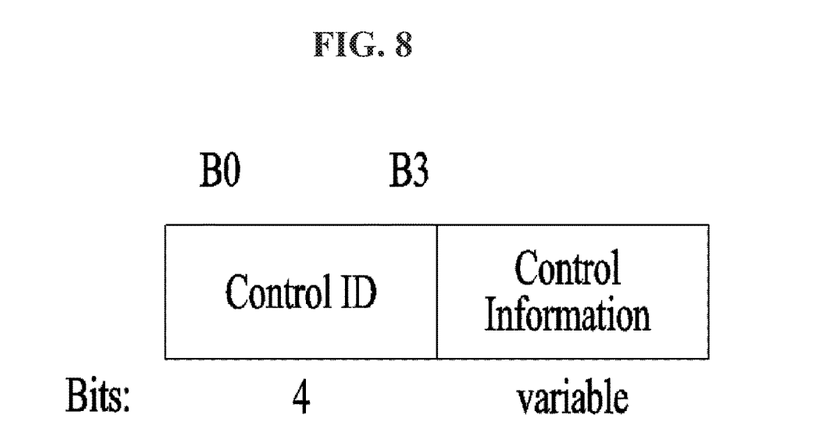

FIGS. 7 and 8 are diagrams illustrating formats of an A-Control subfield for use in transmission of UL scheduling information, which is included in a DL PPDU according to an embodiment of the present invention.

Specifically, FIG. 7 illustrates a structure in which a plurality of A-Control subfields (e.g., N A-Control subfields) are included, each of which has a 30-bit length. In addition, each control subfield of the A-Control subfield may include a 4-bit control ID field as shown in FIG. 8. The values of the control ID field can be configured as shown in Table 4.

TABLE 4

| Control ID value | Meaning | Length, in bits, of the Control Information subfield |
|---|---|---|
| 0 | UL MU response scheduling | TBD |
| 1 | Receive operation mode indication | TBD |
| 2 | HE link adaptation | TBD |
| TBD | ... | |
| 8-15 | Reserved | |

That is, assuming that the control ID field value is set to '0', the UL MU response scheduling information described in the present embodiment can be transmitted.

Based on the above discussion, when the A-Control subfield is used in transmitting the UL MU scheduling information through the DL PPDU, among a total of 30 bits shown in FIG. 7, 26 bits except 4 bits for the control ID can be used for transmission of the UL MU scheduling information. However, compared to the size of the UL scheduling information transmitted through the trigger frame, 26 bits reserved for the UL MU scheduling information are significantly limited. Therefore, in a preferred embodiment of the present invention, control information to be included in the 26-bit control field of the A-Control subfield will be described. In addition, a description will be given of how an STA configures control information when the corresponding control information is not included in the 26-bit control field of the A-Control subfield.

Review of Scheduling Information to be Included in Control Field of DL PPDU

Figure 9:
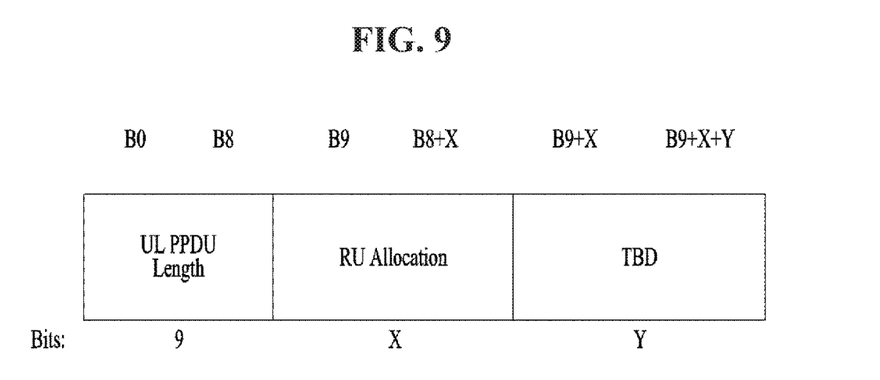
FIG. 9 is a diagram for explaining the most basic control information of UL MU scheduling information to be included in a DL PPDU according to an embodiment of the present invention.

FIG. 9 is a diagram for explaining the most basic control information of UL MU scheduling information to be included in a DL PPDU according to an embodiment of the present invention.

Specifically, among various pieces of UL scheduling information transmitted through the trigger frame, UL PPDU length information and RU allocation information shown in FIG. 9 is the most basic control information to be first included in the 26-bit control field shown in FIG. 8. The reason for why the UL MU scheduling information is transmitted for transmitting BA in response to DL data is to inform the length information of the corresponding UL PPDU and the RU allocation information for the corresponding UL PPDU.

In the case of a 9-bit UL PPDU Length subfield as shown in FIG. 9, a length of up to 512 us can be expressed using 1-us granularity. Alternatively, a length of up to 1024 us can be expressed using 2-us granularity.

However, when an OFDMA symbol of a data field is indicated, a 6-bit UL PPDU length can indicate up to 64*(12.8 us+0.8 us)+legacy PHY header length+length of HE SIG-A+HE LTF length>870 us or a 5-bit UL PPDU length can indicate up to 32*(12.8 us+0.8 us)+legacy PHY header length+length of HE SIG-A+HE LTF length>435.2 us. That is, when considering a space for additional control information, it is determined that 5 or 6 bits of UL PPDU Length subfield is sufficient instead of the 9-bit UL PPDU Length subfield illustrated in FIG. 9. Therefore, it is proposed in a preferred embodiment of the present invention to use a short length of UL PPDU Length subfield.

Meanwhile, the RU Allocation subfield indicates an RU allocated to transmit the UL MU response.

The simplest configuration for the RU Allocation subfield is that the RU Allocation subfield has the same 8-bit length as when it is allocated to the trigger frame. However, the corresponding field can be set to have a 7-bit length in consideration of additionally included other information and operated as follow.

For example, DL MU transmission through a single 80 MHz channel may be configured such that it is not checked by ACK/BA/M-BA through another 80 MHz channel. This may not be an appropriate option if there are many users in an unidentified 80 MHz band. However, considering that it does not frequently occur, the trigger frame may be configured to be used.

Hereinabove, the UL PPDU length information and RU allocation information has been described with reference to FIG. 9. In the following description, other scheduling information will be explained.

Figure 10:
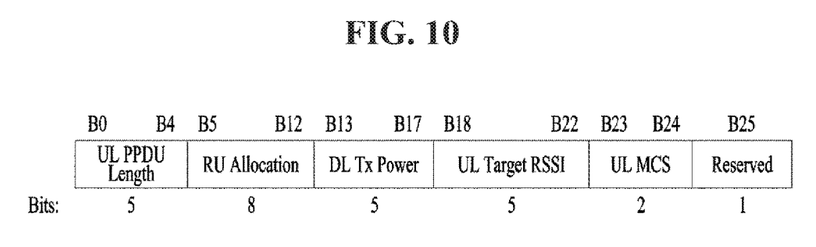
FIG. 10 is a diagram illustrating an example of UL MU scheduling information to be transmitted through a control subfield of a DL PPDU according to a preferred embodiment of the present invention.

FIG. 10 is a diagram illustrating an example of UL MU scheduling information to be transmitted through a control subfield of a DL PPDU according to a preferred embodiment of the present invention.

In the present embodiment, it is proposed that the control information includes length information of a UL PPDU, RU allocation information for the UL PPDU, UL MCS information for the UL PPDU, DL Tx power of an AP, and target receive signal strength indicator (RSSI) information of the AP.

Particularly, this means that the length information of the UL PPDU, the RU allocation information for the UL PPDU, the UL MCS information for the UL PPDU, the DL Tx power of the AP, and the target RSSI information of the AP is selected as information that requires explicit signaling of the UL MU scheduling information transmitted through the trigger frame. On the other hand, other control information can be estimated by an STA based on information of the received DL PPDU without explicit signaling from the AP. Alternatively, predetermined values can be used. Details will be described later.

First, the length information of the UL PPDU and the RU allocation information for the UL PPDU is the same as that described above with reference to FIG. 9. In addition, it is proposed to include a 5-bit UL PPDU Length subfield instead of the 9-bit UL PPDU Length subfield shown in FIG. 9 due to the aforementioned reason.

Since the DL Tx power and UL target PSSI information, which is additionally included compared to FIG. 9, respectively correspond to AP's Tx power and AP's target Rx power of the corresponding UL MU PPDU, it is difficult for the STA to estimate the information when there is no signaling from the AP. To this end, FIG. 10 shows that a 5-bit length of Tx power information and a 5-bit length of Rx power information, i.e., total 10 bits of Tx and Rx power information is signaled.

In FIG. 10, a UL MCS is illustrated as the information requiring explicit signaling. However, unlike the 4-bit MCS information transmitted through the trigger frame, it is proposed in the present embodiment to use a short length (e.g., 2 bits) of MCS. In the case of the 2-bit MCS, it is preferred that any one of four MCSs corresponding to the lowest modulation and coding scheme is selected from among all available MCSs.

In addition, the STA can use predetermined values for omitted information of the UL MU scheduling information. Alternatively, the STA can estimate the omitted information using the information of the received DL MU PPDU. However, in case of transmission of ACK/BA/M-BA, since more robust transmission is generally required unlike an MCS used to transmit data such as a DL MU PPDU, it is difficult to use the MCS applied to the DL MU PPDU. Moreover, if a fixed MCS is applied without consideration of a channel state, it may cause performance degradation.

In other words, when the control field is configured to include the length information of the UL PPDU, the RU allocation information for the UL PPDU, the UL MCS information for the UL PPDU, the DL Tx power of the AP, and the target RSSI information of the AP as shown in FIG. 10, a 26-bit length of control information can be configured. In addition, this control information can be paired with the 4-bit control ID field shown in FIG. 8 in order to satisfy the 30-bit length of subfield.

Review of Handling of Scheduling Information Omitted from Control Field of DL PPDU 1. Control Information Using Information of Received DL MU PPDU The control information subfield of the DL PPDU may not include a CP and LTF type field as shown in FIG. 10. Although the trigger frame uses two bits for this field, the UL MU PPDU actually uses only two values: 2×LTF+1.6 us CP size and 4×LTF+3.2 us CP size. Thus, according to another embodiment of the present invention, a 1-bit LTF and CP field can be used and in this case, values of the corresponding field are given as follows:

(1) 0: 2×LTF and 1.6 us CP size
(2) 1: 4×LTF and 3.2 us CP size

However, even if there is no explicit signal, the STA may be configured to use any one of the two CP and LTF structures according to the received DL PPDU.

In addition, the control information subfield may not include DCM (dual carrier modulation) information as shown in FIG. 10. As described above with reference to FIG. 2, the MCS can be informed through simple 2-bit signaling. Moreover, the STA can determine whether the DCM is applied to the UL MU PPDU by considering the MCS of the DL MU PPDU. That is, when the DCM is applied to the received DL MU PPDU, the STA can determine that the DCM is applied to the UL MU PPDU. Otherwise, the STA may be configured to determine that the DCM is not applied to the UL MU PPDU.

Similarly, the control information subfield may not include bandwidth information. In this case, the SAT may determine that a bandwidth of the UL MU PPDU is the same as that of the DL MU PPDU.

That is, when the SAT fails to receive explicit signaling on the control information as described above, the STA can configure information related to the UL MU PPDU using the information of the received the DL MU PPDU.

2. Control Information not Using the Corresponding Function

The control information subfield of the DL PPDU may not include spatial reuse information as shown in FIG. 10. If the control information subfield includes a spatial reuse field defined in the conventional HE-SIG-A, it may have a length of 4 bits. However, the gain obtained by applying the spatial reuse to ACK/BA-M-BA transmission for UL MU data transmission is not greater than that obtained by saving the space for signaling. Thus, according to an embodiment of the present invention, the control information subfield is configured not to include the spatial reuse information and the STA is preferred to disable spatial reuse according to the received DL PPDU.

Similarly, the control information subfield does not include information on an MU MIMO LTF mode, an STBC, the number of streams, a stream allocation, and a coding type and the STA may set parameters for the MU MIMO LTF mode, the STBC, the number of streams, the stream allocation, and the coding type to '0' according to the received DL PPDU.

Further, it is also preferred to set a cascade indication field to '0' without separate signaling.

Suboptimal Embodiment

The embodiment illustrated in FIG. 10 is not the only way to implement the present invention and other embodiments for the control field of the DL PPDU will be described hereinafter.

(1) TXOP Field

In the case of the conventional MAC duration, 15 bits are reserved for the TXOP field. On the other hand, in the case of the HE-SIG-A, it is expected that the TXOP field may have a length of 5 to 7 bits. However, since the TXOP may not be inserted due to the size limitation, it is also possible to use a 1-bit TXOP field.

If the corresponding field is set to '0', it may indicate that the TXOP value needs to be set to '0'. In general, UL MU ACK/BA is transmitted in the last frame of the TXOP (UL TXOP), it is set to '0'.

If the corresponding field is set to '1', it may indicate that the TXOP value is calculated through TXOP operation. In general, it is configured based on the MAC duration of the current/previous frame.

(2-1) Delta MCS (2 bits):

0: use of the same MCS as that of the currently received DL frame

1: use of an MCS higher by X degrees than that of the currently received DL frame 2: use of an MCS lower by Y degrees than that of the currently received DL frame 3: use of the lowest MCS (e.g., either MCS0 or MCS0+DCM(1))

(2-2) Delta MCS (2 bits):

0: use of the same MCS as that of the currently received DL frame

1: use of an MCS lower by two degrees than that of the currently received DL frame 2: use of the lowest MCS (e.g., either MCS0 or MCS0+DCM(1))

3: reserved (2-3) MCS (1 bit)

0: use of the same MCS as that of the currently received DL frame

1: use of the lowest MCS (e.g., either MCS0 or MCS0+DCM(1))

Figure 11:
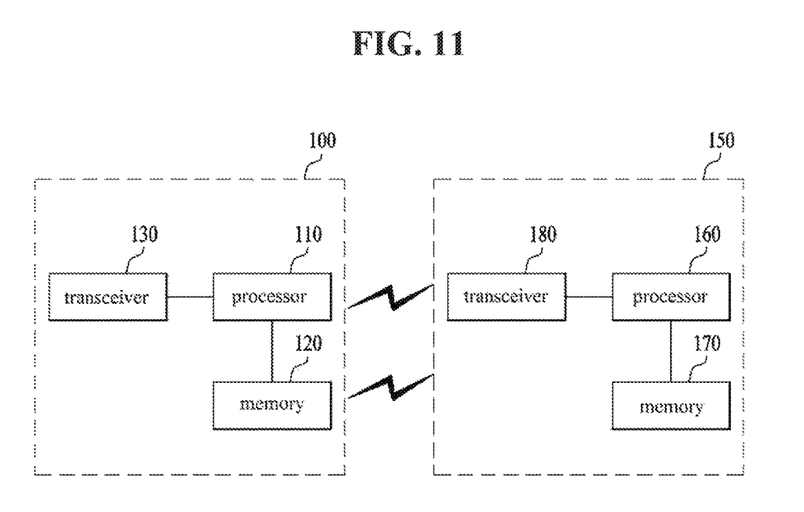
FIG. 11 is a block diagram illustrating exemplary configurations of an AP device (or base station device) and an STA device (or user equipment device) according to an embodiment of the present invention.

FIG. 11 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the embodiments described herein, but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, this document describes the product invention and the method invention and descriptions of both the inventions may be complementarily applied as needed.

INDUSTRIAL APPLICABILITY

The aforementioned embodiments of the present invention can be applied to various wireless communication system including the IEEE 802.11 system.

What is claimed is:

1. A method for transmitting an acknowledgement signal in response to downlink data by a station, STA, in a wireless local area network, WLAN, system, the method comprising:
receiving a downlink physical protocol data unit, PPDU, including:
a control information subfield for uplink scheduling information, and
downlink data
from an access point, AP; and
transmitting, to the AP, an uplink PPDU including an acknowledgement signal in response to the downlink data according to the uplink scheduling information,
wherein the control information subfield includes:
length information of the uplink PPDU,
resource unit, RU, allocation information for the uplink PPDU,
modulation and coding scheme, MCS, information for the uplink PPDU,
transmit power of the AP, and
target receive signal strength indicator, RSSI, information of the AP,
wherein when the downlink PPDU is received, the processor is configured to disable spatial reuse of the uplink PPDU by assuming that the control information subfield does not include spatial reuse information.

2. The method of claim 1, wherein when receiving the downlink PPDU, the STA is configured to change a cyclic prefix, CP, and long training field, LTF, structure into one of two structures:
(1) a structure in which a 4×LTF and a 3.2 us CP are used; and
(2) a structure in which a 2×LTF and a 1.6 us CP are used.

3. The method of claim 1, wherein the control information subfield does not include dual carrier modulation, DCM, information, and wherein the STA is configured to determine whether to apply DCM to the uplink PPDU in consideration of an MCS of the downlink PPDU.

4. The method of claim 1, wherein the control information subfield does not include bandwidth information, and wherein the STA is configured to set a bandwidth of the uplink PPDU to be identical to a bandwidth of the downlink PPDU.

5. The method of claim 1, wherein the control information subfield does not include information on a multi-user multi-input multi-output long training field, MU MIMO LTF, mode, a space time block code, STBC, the number of streams, a stream allocation, and a coding type, and wherein when receiving the downlink PPDU, the STA is configured to set parameters for the MU MIMO LTF mode, the STBC, the number of streams, the stream allocation, and the coding type to 0.

6. The method of claim 1, wherein the MCS information has a length of 2 bits, and wherein the STA is configured to select an MCS level corresponding to the MCS information from four lowest MCS levels among a plurality of predetermined MCS levels.

7. The method of claim 1, wherein the uplink PPDU includes one of an individual acknowledgement signal, a block acknowledgement, BA, signal, and a multi-STA BA signal in response to the downlink data.

8. The method of claim 1, wherein the control information subfield has a length of 30 bits by additionally including 4 bits of control ID information, and wherein the length information of the uplink PPDU has a length of 5 bits.

9. A station, STA, for transmitting an acknowledgement signal in response to downlink data in a wireless local area network, WLAN, system, the STA comprising:
a transceiver configured to receive a downlink physical protocol data unit, PPDU, including:
a control information subfield for uplink scheduling information, and
downlink data
from an access point, AP; and
a processor configured to process the uplink scheduling information and control the transceiver to transmit an uplink PPDU including an acknowledgement signal in response to the downlink data to the AP,
wherein the processor is configured to process the uplink scheduling information by assuming that the control information subfield includes:
length information of the uplink PPDU,
resource unit (RU) allocation information for the uplink PPDU,
modulation and coding scheme (MCS) information for the uplink PPDU,
transmit power of the AP, and
target receive signal strength indicator (RSSI) information of the AP,
wherein when the downlink PPDU is received, the processor is configured to disable spatial reuse of the uplink PPDU by assuming that the control information subfield does not include spatial reuse information.

10. The STA of claim 9, wherein when the downlink PPDU is received, the processor is configured to change a cyclic prefix, CP, and long training field, LTF, structure into one of two structures:
(1) a structure in which a 4×LTF and a 3.2 us CP are used; and
(2) a structure in which a 2×LTF and a 1.6 us CP are used.

11. The STA of claim 9, wherein the processor is configured to determine whether to apply dual carrier modulation, DCM, to the uplink PPDU in consideration of an MCS of the downlink PPDU by assuming that the control information subfield does not include DCM information.

12. A method for receiving an acknowledgement signal in response to downlink data from a station, STA, by an access point, AP, in a wireless local area network, WLAN, system, the method comprising:
transmitting a downlink physical protocol data unit, PPDU, including:
a control information subfield for uplink scheduling information, and
downlink data
to the STA; and
receiving, from the STA, an uplink PPDU including an acknowledgement signal in response to the downlink data according to the uplink scheduling information,
wherein the control information subfield includes:
length information of the uplink PPDU,
resource unit, RU, allocation information for the uplink PPDU,
modulation and coding scheme, MCS, information for the uplink PPDU,
transmit power of the AP, and
target receive signal strength indicator, RSSI, information of the AP,
wherein the control information subfield does not include spatial reuse information, and wherein the AP process signals from the STA assuming that the STA is configured to disable spatial reuse in response to receiving the downlink PPDU.

* * * * *